United States Patent [19]

Yokomatsu et al.

[11] Patent Number: 4,749,283
[45] Date of Patent: Jun. 7, 1988

[54] STATIC PRESSURE BEARING

[75] Inventors: Takao Yokomatsu, Yokohama; Motomu Furukawa, Kawasaki, both of Japan

[73] Assignee: Canon Kabushiki Kaisha, Tokyo, Japan

[21] Appl. No.: 906,272

[22] Filed: Sep. 10, 1986

[30] Foreign Application Priority Data

Sep. 12, 1985 [JP] Japan .................. 60-202617
Mar. 11, 1986 [JP] Japan .................. 61-51339
Sep. 5, 1986 [JP] Japan .................. 61-207961

[51] Int. Cl.⁴ ............................................. F16C 32/06
[52] U.S. Cl. ............................................. 384/12; 384/16; 384/279; 384/471
[58] Field of Search ............... 384/114, 12, 16, 471, 384/279, 144

[56] References Cited

U.S. PATENT DOCUMENTS 2,950,150  8/1960  Ashworth .................. 384/471
3,407,013 10/1968  Weichsel .................... 384/279
4,558,909 12/1985  Stauber ......................... 384/12

Primary Examiner—Lenard A. Footland
Attorney, Agent, or Firm—Fitzpatrick, Cella, Harper & Scinto

[57] ABSTRACT

A static pressure bearing device for relatively supporting, in an ambience, an object for relative movement, comprising a fluid supplying portion for supplying a fluid to at least a portion of a surface of the object, and a suction pump for drawing the fluid supplied to the portion of the surface of the object by the fluid supplying portion, so as to substantially prevent leakage of the fluid into the ambience.

7 Claims, 4 Drawing Sheets

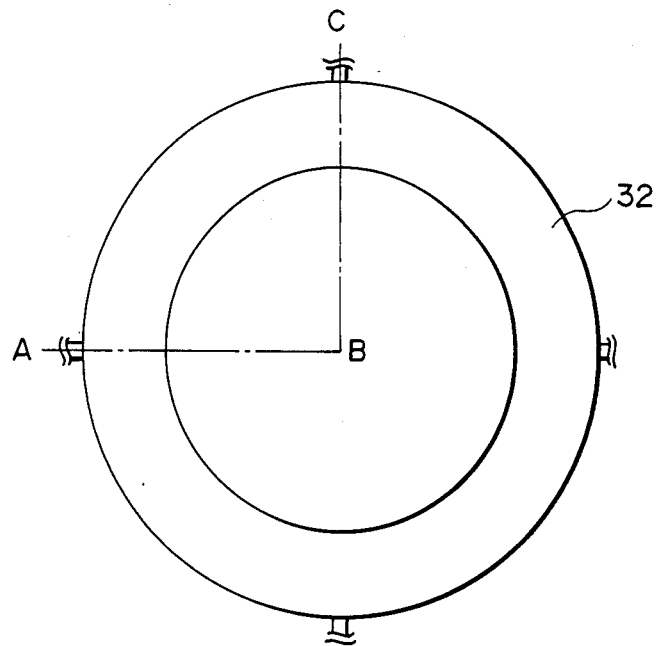
F I G. 3
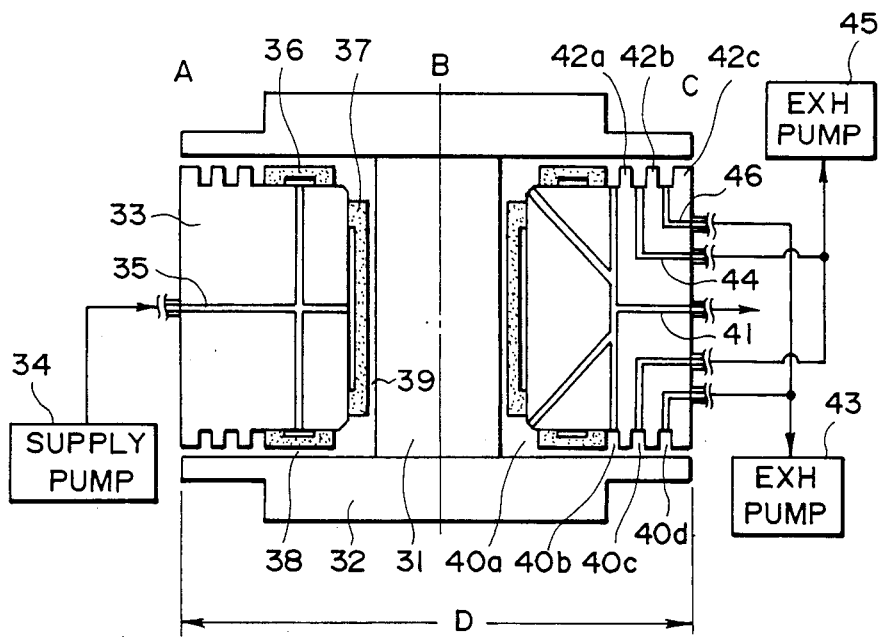
F I G. 4

STATIC PRESSURE BEARING

FIELD OF THE INVENTION AND RELATED ART

This invention relates to a static pressure bearing and, more particularly, to a static pressure bearing suitably usable in a vacuum ambience. For example, the static pressure bearing of the present invention is adapted for use as a bearing guide in a semiconductor device manufacturing exposure apparatus such as an electron beam exposure apparatus, an X-ray exposure apparatus, an ion beam exposure apparatus, etc. Also, the static pressure bearing of the present invention is usable in a vacuum deposition apparatus, a chemical vapor deposition (CVD) apparatus and so on.

Conventionally, guide means for use in a vacuum is provided by coating, with a non-volatile lubricating oil, a bearing guide adapted to be used in the atmosphere. In such contact-type guide means, tolerances of a shaft and/or components of the guide means have a direct influence upon guiding accuracy of the guide means. Therefore, it is very difficult to achieve rectilinear feeding accuracy or rotational feeding accuracy of an order of submicrons.

A high-vacuum adaptable non-contact type bearing device is proposed in Japanese Laid-Open patent application, Laid-Open No. 57516/1983. The proposed is an air-bearing in which the interior of the bearing device is isolated from a high-vacuum ambience. Air pressure is discharged from a static pressure bearing portion and the discharged air filling the interior of the device is exhausted by way of an exhaust passage to the outside of the high-vacuum ambience. A number of air-supplying holes are formed in a bearing surface so that the air-pressure is supplied to a member to be supported by the bearing device. In this type of bearing device, the amount of air discharged from the air-supplying ports is so large that it innevitably and adversely effects the high-vacuum ambience surrounding the bearing device. In consideration thereof, sealing means such as gas-tight bellows are fixedly secured to the bearing device and the member to be supported thereby, so as to isolate the interior of the bearing device from the high-vacuum ambience. Such sealing means is bulky. Also, the sealing means has a direct influence upon the guiding accuracy of the bearing device. Therefore, high-feeding accuracy is difficult to achieve. Moreover, use of the fixed sealing means is a bar to realization of a bearing device capable of guiding rotation of a rotary member.

SUMMARY OF THE INVENTION

It is accordingly a primary object of the present invention to provide a static pressure bearing suitably usable in a vacuum, by which bearing either high rectilinear feeding accuracy or high rotational feeding accuracy is attainable.

Briefly, according to the present invention, there is provided a static pressure bearing device for relatively supporting, in an ambience, an object for relative movement, comprising a fluid supplying portion for supplying a fluid to at least a portion of a surface of the object; and suction means for drawing the fluid supplied to at least said portion of the surface of the object by said fluid supplying portion, so as to substantially prevent leakage of the fluid into the ambience.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 is a top plan view of a static pressure bearing according to a third embodiment of the present invention.

FIG. 4 is a sectional view taken on lines A-B and B-C in FIG. 3, schematically and diagrammatically showing the static pressure bearing of the embodiment of FIG. 3.

DESCRIPTION OF THE PREFERRED EMBODIMENTS

Figure 1:
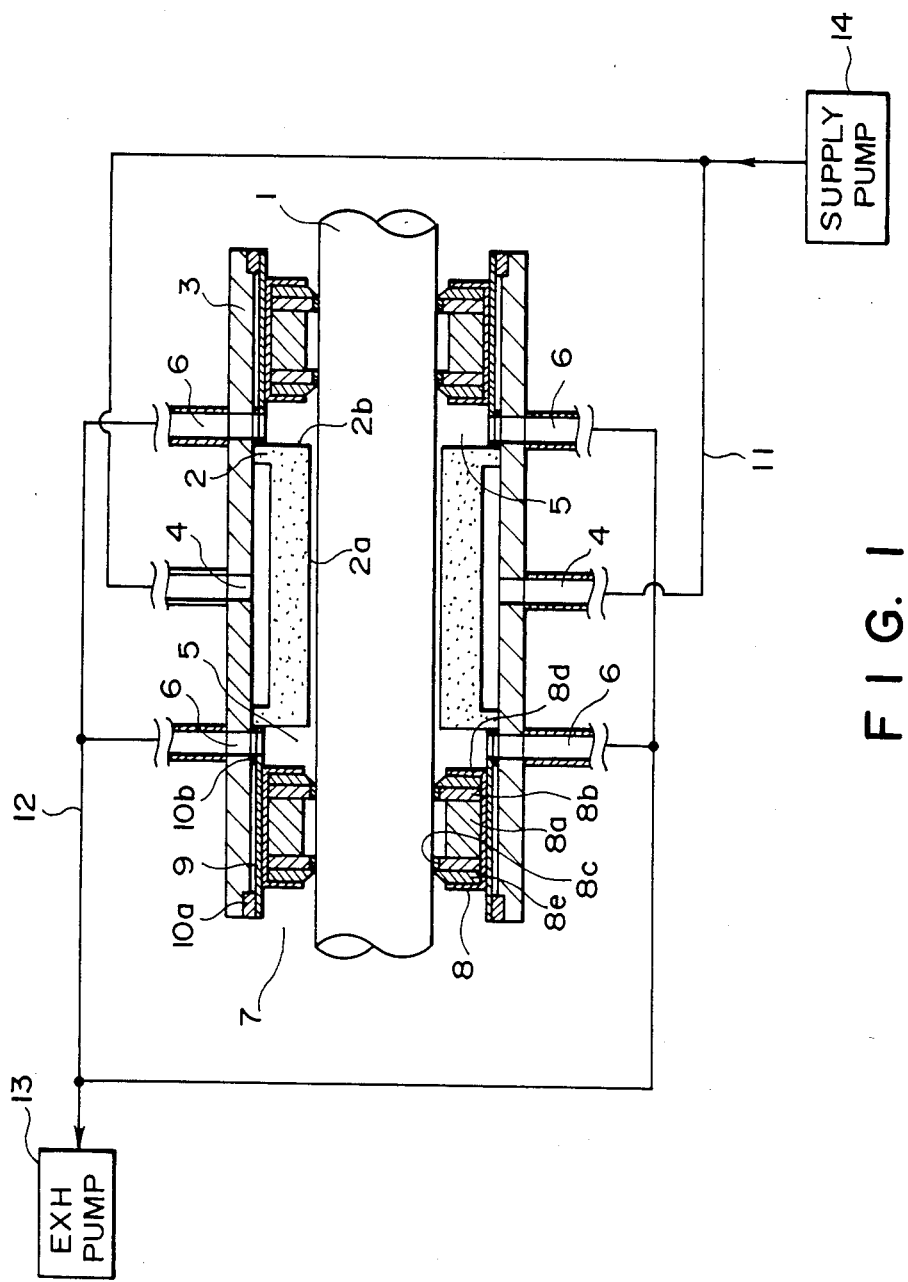
FIG. 1 is a sectional view schematically and diagrammatically showing a static pressure bearing according to a first embodiment of the present invention.

Referring first to FIG. 1, there is shown a static pressure bearing according to the first embodiment of the present invention. A columnar shaft 1 extends horizontally as viewed in this FIG. A fluid discharging portion or pad 2 has a generally cylindrical shape and is made of a porous material. The fluid discharging portion 2 encircles a portion of the shaft 1, as seen from FIG. 1. The fluid discharging portion 2 has an inner cylindrical bearing surface 2a and annular side surfaces 2b. The side surfaces 2b of the discharging portion 2 are coated with a suitable material to prevent gas leakage therefrom. A cylindrical housing 3 extends coaxially with the shaft 1 and accommodates therein various components of the static pressure bearing. The housing member 3 has a plurality of air-pressure supplying ports 4 and a plurality of exhaust ports 6. Air reservoir spaces 5 are defined within the housing member 3 and at opposite sides of the fluid discharging portion 2. The air discharged from the bearing surface 2a of the fluid discharging portion 2 is flows into these spaces 5. Air-pressure supplying passages 11 provide fluid communication between an air-pressure supplying pump 14 and the air-supplying ports 4, so that the air-pressure produced by the pump 14 is supplied to the fluid discharging portion 2 by way of the ports 4. On the other hand, exhaust passages 12 provide fluid communication between a suction pump 13 and the exhaust ports 6, so that the air within the housing member 3 is drawn via the ports 6 to the pump 13. The shaft 1 and the components of the bearing device including the housing member 3 and those accommodated within the housing member 3 are all disposed in a vacuum chamber (not shown), while the two pumps 13 and 14 are placed outside the vacuum chamber.

The air (air-pressure which is supplied from the outside of the vacuum chamber, i.e. from the outside of a high-vacuum ambience 7) to the air supplying ports 4 by means of the air supplying pump 14 is discharged from the bearing surface 2a of the fluid discharging portion 2 to the surface of the shaft 1. By this, a lubricating film is formed between the bearing surface 2a and the surface of the shaft 1. The air thus forming the lubricating film then flows into the spaces 5 and, thereafter, is forcibly exhausted from the exhaust ports 6 via the exhaust passages 12 to the outside of the high-vacuum ambience 7, under the influence of the suction pump 13.

As for the material of the fluid dischariging portion 2, such a porous material that has a sufficiently small number of pores each having a sufficiently small size, is selected. Also, the vacuum pump 13 used in this embodiment has an exhaustion capacity (displacement) which is sufficiently large as compared with the air supply capacity of the pump 14. As a result, the pressure in the spaces 5 can be maintained sufficiently low. This allows effective use of a magnetic fluid seal unit 8 to isolate the interior of the housing member 3 from the ambience, as will be described later in more detail. Actually, experimental results show that, with the pressures of approx. several tens of Torr in the spaces 5, the magnetic fluid seal units 8 satisfactorily seal the spaces 5 against a high-vacuum ambience in the pressure range of $10^{-5}-10^{-8}$ Torr.

In this embodiment, the fluid discharging portion 2 has a sufficient length in the axial direction. This is very effective because the pressure at the middle of the bearing portion decreases very little with the decrease in the pressure of the spaces 5. To the contrary, there is produced a relatively large pressure difference between the bearing portion and the spaces 5, which advantageously improves the stiffness or rigidity of the bearing device.

The bearing device of the present embodiment is provided with a pair of magnetic fluid seal units 8 which are disposed at the opposite sides of the fluid discharging portion 2, such as shown in FIG. 1. Since these seal units 8 are of the same structure, description will be made to one of them, more particularly the left-hand side one in FIG. 1. As shown in this Figure, the seal unit 8 includes a permanent magnet 8a, two pole pieces 8b, magnetic fluid sealing materials 8c, a retainer 8d and scrapers 8e. Each of the scrapers 8e is made of a resilient or elastic material and functions to scrape off the magnetic fluid 8c remaining on the surface of the shaft 1 when the bearing device moves axially relative to the shaft 1. In order to reduce the friction between the scraper 8e and the shaft 1, the tip end of the scraper 8e is formed into a knife edge shape. On the other hand, the shaft 1 has been subjected to surface treatment such as Teflon coating for the purpose of avoiding adhesion of the magnetic fluid.

Each of the magnetic fluid seal units 8 is coupled, by adhesion or the like, to a resilient member 9 which in turn is fixedly secured to the housing member 3 by means of fixing members 10a and 10b. The resilient member 9 used in this embodiment has stiffness or rigidity which is sufficiently less than that of the bearing device. As a result, the magnetic fluid sealing units 8 have a very small influence upon the moving accuracy of the bearing device. Therefore, high-precision feeding is assured.

Figure 2:
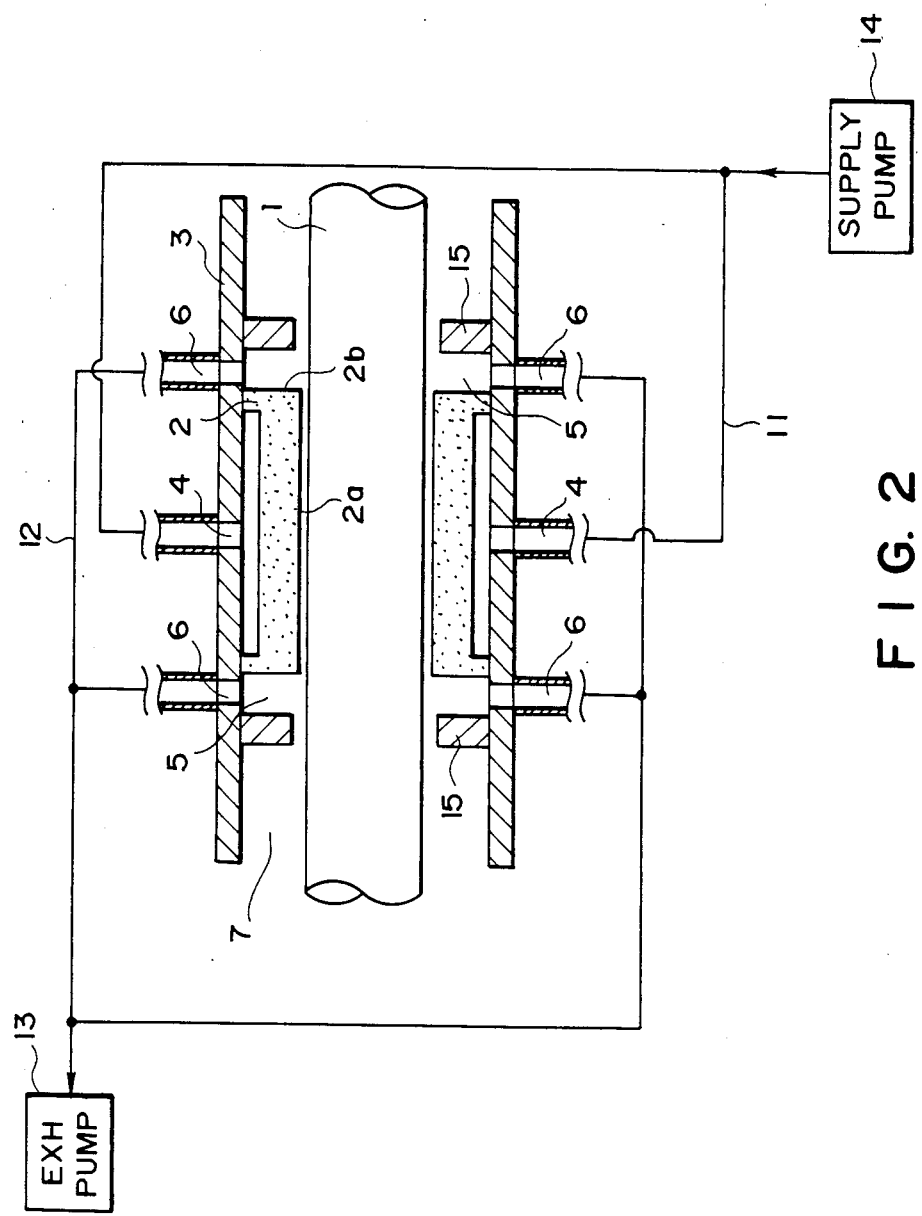
FIG. 2 is a sectional view schematically and diagrammatically showing a static pressure bearing according to a second embodiment of the present invention.

FIG. 2 shows a static pressure bearing according to another embodiment of the present invention. Like numerals in this Figure as those in FIG. 1 denote elements having similar or corresponding functions as of those of the FIG. 1 embodiment.

In the embodiment shown in FIG. 2, a fluid discharging portion 2 is made of such a porous material that has a further reduced number of pores each having a smaller size, as compared with those of the fluid discharging portion 2 of the FIG. 1 embodiment. Also, a vacuum pump 13 used in the present embodiment has a larger exhaustion capacity as compared with that of the pump 13 of the FIG. 1 embodiment. By this, a pressure near that of the high-vacuum ambience 7 can be established in the spaces 5.

In the present embodiment, partition walls 15 each of an annular or ring shape are formed on the internal wall of the housing member 3. Each of these partition walls 5 is formed at a side of an associated one of the exhaust ports 6, remote from the fluid discharging portion 2. Each of the partition walls 15 has an inner cylindrical surface which is spaced from the outer surface of the shaft 1 by a minute gap. In a case where the vacuum in the ambience 7 is not so high, leakage of air from the bearing device is not a serious problem, as compared with the case of the foregoing embodiment. It is to be noted here that, since the pressure in the spaces 5 is very low and since the partition walls 15 provide a sufficiently large resistance to the air flow, only a very small amount of air will leak out of the bearing device. In this respect, the partition walls 15 can be considered as being seal means for satisfactorily sealing the housing member 3 against the vacuum ambience 7. In consideration of this, specific seal means such as the magnetic fluid seal unit in the foregoing embodiment is not provided between the shaft 1 and the housing member 3. Since the partition walls 15 are out of contact with the surface of the shaft 1 and since no specific seal means contacting the shaft 1 is used, the feeding accuracy of the bearing device of the present embodiment is completely free from the effect of the seal means. Therefore, relative movement at a very high feeding accuracy of the static pressure bearing is assured.

In the present embodiment, a pair of partition walls are used. However, two or more pairs of partition walls may be used in order to further improve the leakage preventing function.

In the embodiments shown in FIGS. 1 and 2, the housing member 3 is mounted on a movable stage, although it is not illustrated in the drawings. Of course, the housing member 3 may be formed integrally with such stage. Also, in place of the housing member 3, the shaft 1 may be mounted on the stage. Further, it is to be noted that, where very high rigidity or stiffness of the bearing device is not required, the air-pressure supplying pump 14 may be omitted. That is, the device may be modified so that the air supplying passages 11 are simply open to the atmosphere. Even in such case, a sufficient bearing pressure required in a static pressure bearing can be established only by means of the exhaust pump 13.

FIG. 3 is a plan view of a static pressure bearing according to a further embodiment of the present invention, and FIG. 4 is a sectional view of the device of FIG. 3, taken on lines A-B and B-C in FIG. 3. Denoted by numeral 31 is a rotary shaft; by 32, thrust collars; and by 33, a main assembly of the bearing device. The main assembly 33 of the static pressure bearing device is accommodated in a vacuum chamber, not shown. An air-pressure supplying pump 34 is disposed outside the vacuum chamber. Passage means 35 is formed within the main assembly 33 of the bearing device and it is open to each of a radial surface and a thrust surface of the bearing assembly. Denoted by numeral 36 is a thrust bearing portion; by 37, a radial bearing portion; by 38, a thrust gap; by 39, a radial gap; by 40a–40d, fluid exhaust ports; by 41, passage means which is in fluid communication with each of the exhaust ports 40a and 40b; by 42a–42c, partition walls; by 43, a suction pump; by 44 and 46, passage means which are in fluid communication with the exhaust ports 40c and 40d, respectively, of the bearing assembly 33; and by 45, another suction pump.

In operation, the air supplying pump 34 supplies an air (air-pressure) to each of the thrust bearing portion 36 and the radial bearing portion 37 by way of the passage means 35. Similarly to the foregoing embodiments, each of the thrust bearing portion 36 and the radial bearing portion 37 is made of a porous material in order that high rigidity is attained with the use of a decreased rate of flow of the air. In each of the thrust gaps 38 and the radial gap 39, a fluid lubricating film is formed, as in the foregoing embodiments. The air supporting or bearing the thrust collars 32 and the rotational shaft 31 then flows to the fluid exhaust portions 40a and 40b and, from there, they are exhausted to the atmosphere outside the vacuum chamber by way of the passage means 41. With this arrangement, pressure distributions caused at the thrust gaps 38 and the radial gaps 39, respectively, are substantially the same as those when the bearing device is operated in the atmosphere. Also, substantially the same stiffness as that attainable in the atmosphere is obtained.

The fluid exhaust portion 40b is at a pressure approximately equal to the atmospheric pressure, and thus approximately at a pressure of 1 atm. For this reason, the air tends to flow into the vacuum chamber side which is at a lower pressure. Since, however, partition walls 42a formed on the top and the bottom of the bearing assembly 33 are effective to reduce the spacing between the bearing assembly 33 and the upper and lower thrust collars 32, a great resistance to the air flow is produced at these portions. Therefore, only a very small amount of air will flow into the fluid exhaust portion 40c. Moreover, by means of the suction pump 45 disposed outside the vacuum chamber, the fluid exhaust portion 40c is evacuated by way of the passage means 44 such that the pressure in this portion is maintained reduced. Additionally, partition walls 42b formed on the top and the bottom of the bearing assembly 33 at positions outwardly of the partition walls 42a provide similar resistance to the air flow. Also, the fluid exhaust portion 40d is evacuated by way of the passage means 46 under the influence of the suction pump 43 disposed outside the vacuum chamber. Further, third partition walls 42c formed on the top and the bottom of the bearing assembly 33 provide similar resistance to the air flow. As a result of the combined arrangement, only a limited amount of air will flow into the vacuum chamber.

The pressure in the vacuum chamber is determined by the balance of the exhaustion speed (displacement) of the suction pump evacuating the chamber and the flow rate of the air from the static pressure bearing into the chamber. Experimental results show that, for example, the fluid exhaust portion 40d is maintained at a pressure of an order of $1 \times 10^{-1}$ Torr under the condition that the gap between the thrust collar 32 and the partition wall 42 is 10 microns or less and with the use of an oil-rotation type pump having a displacement of an order of several hundred liters/min for each of the suction pumps 43 and 45. When the outer diameter D of the bearing device was 200 mm and where a turbo molecular pump having a displacement of an order of 1000 liters/sec was used as the pump for evacuating the vacuum chamber, the vacuum chamber was maintained at a pressure of approx. $10^{-5}$ Torr.

Experimental results also show that a vacuum chamber pressure of an order of $10^{-6}$ Torr is attainable by further reducing the gap between the thrust collar 32 and the partition 42, by using a chamber evacuating pump having a larger displacement and by increasing the number of fluid exhaust portions and the partition walls thereby to further decrease the pressure in the final fluid exhaust portion.

While, in the present embodiment, the static pressure bearing is provided by a combination of a thrust bearing portion and a radial bearing portion, a single thrust bearing structure or a single radial bearing structure is of course attainable in accordance with the concept of the present embodiment.

Figure 5:
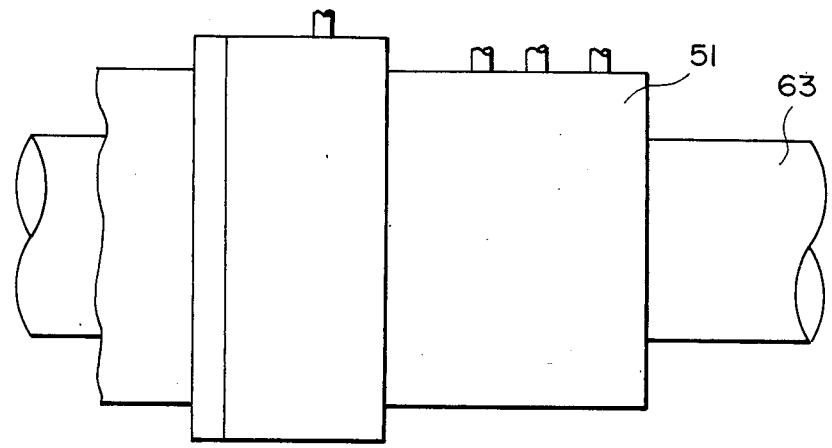
FIG. 5 is a fragmentary plan view of a static pressure bearing according to a fourth embodiment of the present invention.
Figure 6:
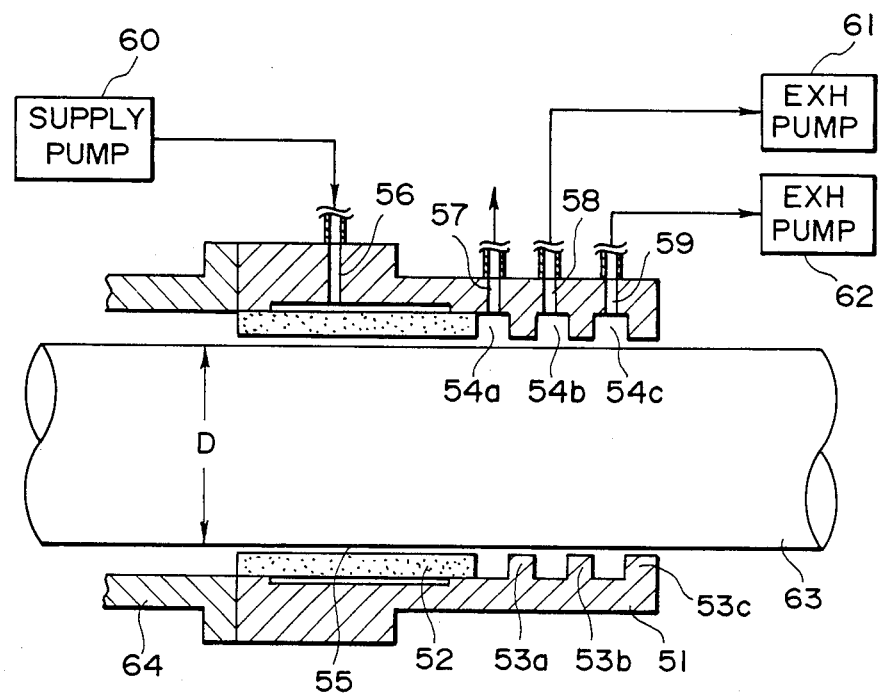
FIG. 6 is a sectional view schematically and diagrammatically showing the static pressure device of the embodiment of FIG. 5.

FIG. 5 is a plan view of a static pressure bearing according to a still further embodiment of the present invention, and FIG. 6 is a sectional view of the bearing device of FIG. 5. Denoted generally by numeral 51 is a main assembly of the bearing device of the present embodiment which is adapted to rectilinearly move relative to a guide bar 63. A coupler 64 is provided to couple the illustrated bearing device with another bearing device (not shown) which is of the same structure as of that of the illustrated one but mounted on the guide bar 63 in the opposite direction. These bearing devices are placed in a vacuum chamber, not shown. An air-pressure supplying pump 60 is disposed outside the vacuum chamber. Passage means 56 is connected, at its one end, to the air supplying pump 60 and opens, at its other end, to a radial surface of the bearing assembly. Denoted by numeral 52 is a fluid discharging portion; by 55, a bearing gap; by 54a-54c, fluid exhaust portions; by 57, passage means which is in fluid communication with the exhaust port 54a of the bearing assembly 53; by 53a-53c, partition walls; by 58 and 59, passage means which are in fluid communication with the exhaust ports 54b and 54c of the bearing assembly 51, respectively; and by 61 and 62, suction pumps which are in fluid communication with the passage means 58 and 59, respectively.

In operation, the air supplying pump 60 supplies air (air pressure) to the fluid discharging portion 52 by way of the passage means 56. As in the foregoing embodiments, the fluid discharging portion 52 is made of a porous material in order that high rigidity is attainable with the use of a decreased flow rate. A fluid lubricating film is formed in the bearing gap 55 and the air thus forming the lubricating film then flows into the fluid exhaust portion 54a. Subsequently, the air flows therefrom into the passage means 57 so that it is exhausted into the atmosphere outside the vacuum chamber. As a result, the pressure distribution at the bearing gap 55 is substantially the same as that when the bearing device is operated in the atmosphere. Also, substantially the same rigidity as that attainable in the atmosphere is obtained.

The fluid exhaust portion 54a is at a pressure approximately equal to the atmospheric pressure, and thus approximately at a pressure of 1 atm. For this reason, the air tends to flow into the vacuum chamber side which is at a lower pressure. Since, however, the partition wall 53a formed on the bearing assembly 51 is effective to reduce the spacing between the bearing assembly 51 and the guide bar 63, a great resistance to the air flow is produced at this portion. Therefore, only a very small amount of air will flow into the fluid exhaust portion 54b. Moreover, by means of the suction pump 61 disposed outside the vacuum chamber, the fluid exhaust portion 54b is evacuated by way of the passage means 58 such that the pressure in this portion is maintained reduced. Additionally, partition wall 53b formed on the bearing assembly 51 at a position outward of the partition wall 53a provides similar resistance to the air flow. Also, the fluid exhaust portion 54c is evacuated by way of the passage means 59 under the influence of the suction pump 62 disposed outside the vacuum chamber. Further, third partition wall 53c formed on the bearing assembly 51 provides similar resistance to the air flow. As a result of the combined arrangement, only a limited amount of air will flow into the vacuum chamber.

The pressure in the vacuum chamber is determined by the balance of the exhaustion speed of the suction pump evacuating the chamber and the flow rate of the air from the static pressure bearing into the chamber. Experimental results show that, for example, the fluid exhaust portion 54c is maintained at a pressure of an order of $1 \times 10^{-1}$ Torr under the condition that the gap between the guide bar 63 and the partition wall 53 is 10 microns or less and with the use of an oil-rotation type pump having a displacement of an order of several hundred liters/min for each of the suction pumps 61 and 62. When the outer diameter D of the guide bar 63 was 40 mm and where a turbo molecular pump having a displacement of an order of 1000 liters/sec was used as the pump for evacuating the vacuum chamber, the vacuum chamber was maintained at a pressure of approx. $10^{-5}$ Torr.

Experimental results also show that a vacuum chamber pressure of an order of $10^{-6}$ Torr is attainable by further reducing the gap between the guide bar 63 and the partition 53, by using a chamber evacuating pump having a larger displacement and by increasing the number of fluid exhaust portions and the partition walls thereby to further decrease the pressure in the final fluid exhaust portion.

While the invention has been described with reference to the structures disclosed herein, it is not confined to the details set forth and this application is intended to cover such modifications or changes as many come within the purposes of the improvements or the scope of the following claims.

What is claimed is:

1. A static pressure bearing device for relatively supporting an object for relative movement, comprising:
    a housing;
    a fluid supplying portion for supplying a fluid into said housing and to at least a portion of a surface of the object;
    suction means for drawing the fluid supplied to said portion of the surface of the object by said fluid supplying portion; and
    wall means for substantially sealing a space between said housing and the object;
    wherein said suction means includes a plurality of exhaust ports formed in said housing and a suction pump communicated with said exhaust ports, for drawing the fluid out of said housing, wherein said wall means includes a plurality of walls provided on said housing, and wherein said exhaust ports and said walls are disposed alternately.

2. A device according to claim 1, wherein the object comprises a rod-like member and wherein said fluid supplying portion includes fluid discharging means adapted to guide relative rectilinear movement of the rod-like member.

3. A device according to claim 1, wherein at least one of said exhaust ports is open to atmosphere, such that a portion of the fluid supplied by said fluid supplying portion to said portion of the surface of the object is exhaust to atmosphere by said at least one port.

4. A device according to claim 1, wherein a fluid pressure is defined at each exhaust port, and wherein a value of the fluid pressure at each exhaust port decreases as a distance of the exhaust port from the fluid supplying portion increases.

5. A static pressure bearing device for relatively supporting an object for relative movement, said device comprising:
    a housing;
    a fluid supplying portion for allowing a fluid to be supplied into said housing and to at least a portion of a surface of the object; and
    sealing means for substantially sealing a space between said housing and the object, said sealing means including suction means having a plurality of exhaust ports formed in said housing, for drawing the fluid supplied to said portion of the surface of the object, said sealing means further including wall means having a plurality of walls provided on said housing and disposed in an alternate fashion with said exhaust ports, said walls cooperating with said exhaust ports to substantially seal the space between said housing and the object.

6. A device according to claim 5, wherein at least one of said exhaust ports is open to atmosphere, such that a portion of the fluid supplied by said fluid supplying portion to said portion of the surface of the object is exhausted to atmosphere by said at least one port.

7. A device according to claim 5, wherein a fluid pressure is defined at each exhaust port, and wherein a value of the fluid pressure at each exhaust port decreases as a distance of the exhaust port from the fluid supplying portion increases.

* * * * *

UNITED STATES PATENT AND TRADEMARK OFFICE
CERTIFICATE OF CORRECTION

PATENT NO. : 4,749,283

DATED : June 7, 1988

INVENTOR(S) : Takao Yokomatsu, et al.

It is certified that error appears in the above-identified patent and that said Letters Patent is hereby corrected as shown below:

COLUMN 1

Line 19, "adaptcd" should read --adapted--;

Line 28, after "proposed" insert --device--; and

Line 39, "innevitably" should read --inevitably--.

COLUMN 2

Line 46, "is" should be deleted.

COLUMN 4

Line 8, "5" should read --15--.

UNITED STATES PATENT AND TRADEMARK OFFICE
CERTIFICATE OF CORRECTION

PATENT NO. : 4,749,283

DATED : June 7, 1988

INVENTOR(S) : Takao Yokomatsu, et al.

It is certified that error appears in the above-identified patent and that said Letters Patent is hereby corrected as shown below:

COLUMN 5

Line 12, "gaps" should read --gap--; and

Line 17, "they are" should read --it is--.

COLUMN 7

Line 40, "many" should read --may--.

COLUMN 8

Line 19, "exhaust" should read --exhausted--.

Signed and Sealed this

Thirtieth Day of May, 1989

Attest:

DONALD J. QUIGG

Attesting Officer

Commissioner of Patents and Trademarks